US 12,315,121 B2

(12) United States Patent
Hu et al.

(10) Patent No.: US 12,315,121 B2
(45) Date of Patent: May 27, 2025

(54) METHOD AND APPARATUS FOR PATCHING CLOUD AREA OF SATELLITE IMAGE SEQUENCING

(71) Applicant: AEROSPACE INFORMATION RESEARCH INSTITUTE, CHINESE ACADEMY OF SCIENCES, Beijing (CN)

(72) Inventors: Changmiao Hu, Beijing (CN); Ping Tang, Beijing (CN); Zheng Zhang, Beijing (CN); Lianzhi Huo, Beijing (CN); Hongyi Li, Beijing (CN); Xiaojun Shan, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 612 days.

(21) Appl. No.: 17/641,571

(22) PCT Filed: Oct. 17, 2019

(86) PCT No.: PCT/CN2019/111581
§ 371 (c)(1),
(2) Date: Aug. 4, 2022

(87) PCT Pub. No.: WO2021/046965
PCT Pub. Date: Mar. 18, 2021

(65) Prior Publication Data
US 2023/0094679 A1    Mar. 30, 2023

(30) Foreign Application Priority Data
Sep. 9, 2019   (CN) .......................... 201910857550.8

(51) Int. Cl.
G06T 5/00 (2024.01)
G06T 5/50 (2006.01)
(Continued)

(52) U.S. Cl.
CPC .................. *G06T 5/77* (2024.01); *G06T 5/50* (2013.01); *G06T 7/12* (2017.01); *G06T 7/187* (2017.01);
(Continued)

(58) Field of Classification Search
CPC .. G06T 5/77; G06T 7/187; G06T 7/12; G06T 5/50; G06T 2207/10016;
(Continued)

(56) References Cited

U.S. PATENT DOCUMENTS 9,542,600 B2 * 1/2017 Buchanan ............... G06V 10/56
9,562,971 B2 * 2/2017 Shenkar ................ G01S 7/4808
(Continued)

FOREIGN PATENT DOCUMENTS

CN   104008543   8/2014
CN   105046708   11/2015
(Continued)

OTHER PUBLICATIONS

"Multi-temporal remote sensing image thick cloud removal" CNKI (English abstract only).
(Continued)

*Primary Examiner* — Gregory M Desire
(74) *Attorney, Agent, or Firm* — VOLPE KOENIG

(57) ABSTRACT

A method and apparatus for patching a cloud area of a satellite image sequence. The method includes: identifying and expanding a cloud area and a cloud shadow area from each of a plurality of multispectral images of a target area and generating a plurality of single-band images; calculating at least one reference image required for patching the
(Continued)

multispectral image and a patching sequence of reference images; determining a patching area of the multispectral image according to a cloud mask image; replacing pixel values of the patching area with pixel values of non-cloud areas of the reference images according to the patching sequence, to obtain a replacement patching image; recording serial number values of the reference images in the patching area to obtain a replacement reference mask image; and performing cloud patching on each replacement patching image and each replacement mask image in the target area through Poisson fusion.

15 Claims, 11 Drawing Sheets

(51) Int. Cl.
    *G06T 5/77*     (2024.01)
    *G06T 7/12*     (2017.01)
    *G06T 7/187*     (2017.01)
    *G06V 10/74*     (2022.01)
    *G06V 20/13*     (2022.01)

(52) U.S. Cl.
    CPC ............ *G06V 10/761* (2022.01); *G06V 20/13* (2022.01); *G06T 2207/10016* (2013.01); *G06T 2207/10036* (2013.01); *G06T 2207/20021* (2013.01); *G06T 2207/20221* (2013.01)

(58) Field of Classification Search
    CPC . G06T 2207/10036; G06T 2207/20021; G06T 2207/20221; G06V 10/761; G06V 20/13
    See application file for complete search history.

(56) References Cited

U.S. PATENT DOCUMENTS

| | | | | |
|---|---|---|---|---|
| 9,584,676 B2* | 2/2017 | Suzuki | ............... | H04N 1/00127 |
| 9,613,388 B2* | 4/2017 | Loss | ....................... | G06T 15/04 |
| 9,710,714 B2* | 7/2017 | Chen | ..................... | G06V 10/806 |
| 10,212,410 B2* | 2/2019 | Liu | ........................ | H04N 13/204 |
| 10,621,467 B2* | 4/2020 | Guan | ........................ | G06F 18/24 |
| 10,991,072 B2* | 4/2021 | Zhang | ..................... | G06T 7/194 |
| 11,017,507 B2* | 5/2021 | Nagare | ..................... | G06T 5/40 |
| 11,476,795 B2* | 10/2022 | West | ........................ | H02S 10/20 |
| 2007/0291170 A1 | 12/2007 | Han et al. | | |

FOREIGN PATENT DOCUMENTS

| | | |
|---|---|---|
| CN | 105678777 | 6/2016 |
| CN | 106485740 | 3/2017 |
| CN | 106940887 | 7/2017 |
| CN | 107103295 | 8/2017 |
| CN | 107230195 | 10/2017 |
| CN | 108109126 | 6/2018 |
| CN | 108230376 | 6/2018 |

OTHER PUBLICATIONS

Hu et al., "Automatic Cloud Removal from Multi-Temporal Landsat Collection 1 Data Using Poisson Blending" *IEEE International Geoscience and Remote Sensing Symposium*, 2019, 978-1-5386-9154-0/19, 1661-1664.

International Search Report issued in Corresponding PCT Application No. PCT/CN2019/111581, dated May 27, 2020 (English Translation).

Lin et al., "Cloud Removal From Multitemporal Satellite Images Using Information Cloning" IEEE Transactions Geoscience and Remote Sensing, 2012 (English abstract only).

Office Action and Search Report issued in Corresponding Chinese Application No. 2019108575508, dated Sep. 2, 2021 (English Translation provided).

* cited by examiner

METHOD AND APPARATUS FOR PATCHING CLOUD AREA OF SATELLITE IMAGE SEQUENCING

CROSS-REFERENCE TO RELATED APPLICATIONS

This application is a national phase application under 35 U.S.C. § 371 of International Application No. PCT/CN2019/111581 filed 17 Oct. 2019, which claims priority to Chinese Patent Application No. 201910857550.8 filed 9 Sep. 2019. The entire contents of each of the above-referenced disclosures is specifically incorporated by reference herein without disclaimer.

TECHNICAL FIELD

The present disclosure relates to remote sensing image processing technologies, and in particular, to a method and an apparatus for patching a cloud area of a satellite image sequence.

BACKGROUND

Clouds have relatively high radiance in remote sensing satellite images. Due to the occlusion of clouds, the satellite image will have spectral distortion of situ objects, which affects the production and application of remote sensing data products. Detection and patching of a cloud area has always been an important subject in remote sensing image processing. Due to the limitation of remote sensing data sources, the early cloud detection and patching technologies were mostly based on a single image or a few number of images, and accuracy of cloud detection and cloud area patching was limited. With the development of remote sensing technology and the increase of remote sensing satellites put into operation, there is a massive scale of satellite data currently available. Using the existing massive historical remote sensing data, inversion of the distribution of clouds and cloud shadows based on quantitative remote sensing theory, interpolating cloud and cloud shadow areas based on massive historical images in a same area, and obtaining high-quality cloud-free remote sensing images have become research hotspots in current remote sensing data preprocessing.

SUMMARY

Embodiments of the present disclosure provide a method and an apparatus for patching a cloud area of a satellite image sequence, so as to solve one or more technical problems in the existing technology.

According to a first aspect, an embodiment of the present disclosure provides a method for patching a cloud area of a satellite image sequence, including:
 identifying and expanding a cloud area and a cloud shadow area from each of a plurality of multispectral images of a target area, and generating a plurality of single-band images;
 calculating at least one reference image required for patching the multispectral images and a patching sequence of reference images according to similarities among the single-band images, where the reference image is selected from one or more of the plurality of multispectral images;
 determining a patching area of the multispectral image according to a cloud mask image corresponding to the single-band image;
 replacing pixel values of the patching area of the multispectral image with pixel values of non-cloud areas of the reference images according to the patching sequence, to obtain a replacement patching image;
 recording serial number values of the reference images, corresponding to each of the multispectral images, in the patching area, to obtain a replacement reference mask image; and
 performing cloud patching on each replacement patching image and each replacement reference mask image in the target area through Poisson fusion.

In an implementation, the identifying and expanding the cloud area and the cloud shadow area from each of the plurality of multispectral images of the target area, and generating the plurality of single-band images, includes:
 identifying the cloud area and the cloud shadow area from the multispectral images, and generating a cloud mask image to be selected;
 remarking a cloud area and a cloud shadow area, which are less than a first preset pixel value, in the cloud mask image to be selected as a clear ground surface, and remarking a clear ground surface, which is less than a second preset pixel value, as the cloud area; and
 inflating the remarked cloud area to a scale with a radius of no more than a first extended pixel, and inflating the remarked cloud shadow area to a scale with a radius of no more than a second extended pixel, to obtain the cloud mask image.

In an implementation, the calculating the at least one reference image required for patching the multispectral images and the patching sequence of the reference images according to the similarities among the single-band images, includes:
 for the plurality of multispectral images and a plurality of cloud mask images, generating thumbnails of the single-band images and thumbnails of the cloud mask images based on a preset waveband by using a nearest neighbor interpolation method;
 calculating the similarities among the single-band images according to the thumbnails of the single-band images;
 filling a marked area in the multispectral image corresponding to the single-band image by using non-cloud area pixels in thumbnails of the reference images in sequence, according to a ranking of similarities between the reference images and the single-band image, where the marked area is marked by the thumbnail of the cloud mask image corresponding to the single-band image; and
 recording the reference images used in a filling process and a corresponding patching sequence in a case where the marked area is filled or a filled area is no longer reduced.

In an implementation, the performing cloud patching on each replacement patching image and each replacement reference mask image in the target area through Poisson fusion, includes:
 setting a guide vector value outside the patching area of the multispectral image to 0;
 dividing a boundary of the multispectral image into a patching area boundary and a patching area inner boundary; and
 for guide vector values at the patching area inner boundary, using adjacent pixel values from a same reference image.

In an implementation, the calculating the similarities among the single-band images according to the thumbnails of the single-band images includes:

calculating the similarities by using a structural similarity index, an image acquisition time, and a cloud cover amount, where a calculation formula is as follows:

$$S_{ij} = a \cdot SSIM(I_i, I_j) + b \cdot \frac{1}{T_{ij}} + c \cdot \frac{C_j + C_{ij}}{2M_{ij}}$$

where a, b, and c are weighting coefficients, $S_{ij}$ is a similarity between thumbnails $I_i$ and $I_j$ of the single-band images, $SSIM(I_i, I_j)$ is a structural similarity index of the thumbnails $I_i$ and $I_j$, $T_{ij}$ is an acquisition time interval of the thumbnails $I_i$ and $I_j$, $C_j$ is a cloud cover amount of the thumbnail $I_j$, $C_{ij}$ is a common cloud area and cloud shadow area of the thumbnails $I_i$ and $I_j$, $M_i$ and $M_j$ are cloud mask thumbnails corresponding to the thumbnails $I_i$ and $I_j$ respectively, and $M_{ij}$ is a number of common non-zero pixels in $M_i$ and $M_j$.

In an implementation, a calculation formula of the structural similarity index is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

where $SSIM(I_i, I_j)$ is the structural similarity index of the thumbnails $I_i$ and $I_j$, C is a constant, $\mu_i$ and $\mu_j$ are mean values of pixel positions with a corresponding cloud mask area value of 1 of the thumbnails $I_i$ and $I_j$ respectively, $\sigma_i$ and $\sigma_j$ are standard deviations of the pixel positions, with the corresponding cloud mask area value of 1, of the thumbnails $I_i$ and $I_j$ respectively, $\sigma_{ij}$ is a covariance of the pixel positions, with the corresponding cloud mask area value of 1, of the thumbnails $I_i$ and $I_j$, and the cloud mask area value includes a cloud area value and a cloud shadow area value.

According to a second aspect, an embodiment of the present disclosure provides an apparatus for patching a cloud area of a satellite image sequence, including:

a cloud mask extraction and finishing module configured for identifying and expanding a cloud area and a cloud shadow area from each of a plurality of multispectral images of a target area, and generating a plurality of single-band images;

a similarity calculation module configured for calculating at least one reference image required for patching the multispectral image and a patching sequence of reference images according to similarities among the single-band images, where the reference image is selected from one or more of the plurality of multispectral images;

a reference data selection module configured for determining a patching area of the multispectral image according to a cloud mask image corresponding to the single-band image;

a direct replacement patching module configured for replacing pixel values of the patching area of the multispectral image with pixel values of non-cloud areas of the reference images according to the patching sequence, to obtain a replacement patching image;

a replacement recording module configured for recording serial number values of the reference images, corresponding to each of the multispectral images, in the patching area, to obtain a replacement reference mask image; and a Poisson fusion patching module configured for performing cloud patching on the replacement patching image and the replacement reference mask image through Poisson fusion.

In an implementation, the cloud mask extraction and finishing module includes:

an initial unit configured for identifying the cloud area and the cloud shadow area from the multispectral image, and generating a cloud mask image to be selected;

a marking unit configured for remarking a cloud area and a cloud shadow area, which are less than a first preset pixel value, in the cloud mask image to be selected as a clear ground surface, and remarking a clear ground surface, which is less than a second preset pixel value, as the cloud area; and an inflating unit configured for inflating the remarked cloud area to a scale with a radius of no more than a first extended pixel, and inflating the remarked cloud shadow area to a scale with a radius of no more than a second extended pixel, to obtain the cloud mask image.

In an implementation, the similarity calculation module includes:

an interpolation unit configured for: for the plurality of multispectral images and a plurality of cloud mask images, generating thumbnails of the single-band images and thumbnails of the cloud mask images based on a preset waveband by using a nearest neighbor interpolation method;

a calculating unit configured for calculating the similarities among the single-band images according to the thumbnails of the single-band images;

a filling unit configured for filling a marked area in the multispectral image corresponding to the single-band images by using non-cloud area pixels in the thumbnails of the reference images in sequence, according to a ranking of similarities between the reference images and the single-band image, wherein the marked area is marked by the thumbnail of the cloud mask image corresponding to the single-band image; and a recording unit configured for recording the reference images used in a filling process and a corresponding patching sequence in a case where the marked area is filled or a filled area is no longer reduced.

In an implementation, the Poisson fusion patching module includes:

a setting unit configured for setting a guide vector value outside the patching area of the multispectral image to 0;

a dividing unit configured for dividing a boundary of the multispectral image into a patching area boundary and a patching area inner boundary; and a fusion unit configured for: for guide vector values at the patching area inner boundary, using adjacent pixel values from a same reference image.

An embodiment in the above disclosure has the following advantages or beneficial effects: on the one hand, the accuracy and applicability of cloud detection and patching are improved; on the other hand, in terms of result accuracy and computational complexity, requirements of automatic processing of massive data can be better satisfied.

Other effects of the foregoing optional manners will be described below in combination with specific embodiments.

BRIEF DESCRIPTION OF THE DRAWINGS

The drawings are used to better understand the scheme and do not constitute a limitation to the present disclosure.

Wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

The main idea of the present disclosure is: for data of a plurality of multispectral images obtained by remote sensing satellites in a same geographical area (a target area) at different times, it is assumed that a type of ground surface coverage does not change greatly, and the main factor causing the change is moving clouds and cloud shadows. Quality bands included in a ground surface reflectance product are used to automatically generate cloud and cloud shadow masks, and thumbnails are used to quickly obtain a ranking of similarity between images, and then a plurality of reference images used to patch each multispectral image are determined. Then, for the cloud area and the cloud shadow area marked by the cloud mask in each multispectral image, pixel positions corresponding to the reference images are directly replaced into the multispectral image to be patched based on a patching sequence, to obtain a direct replacement patching image of each multispectral image. At the same time, a serial number of a reference image corresponding to each replacement pixel is recorded to obtain a replacement reference mask image. Finally, the Poisson fusion algorithm is performed on the direct replacement patching image and the replacement reference mask image to eliminate a spectral difference in the patching area, and a seamless cloud and cloud shadow patching result is obtained for each multispectral image.

Multispectral image data of remote sensing satellites, typically represented by Landsat satellites, includes Landsat 4/5/7/8, sensors such as Thematic Mapper (TM), Enhanced Thematic Mapper Plus (ETM+), and Operational Land Imager (OLI), and panchromatic, multispectral images with a spatial resolution of not less than 30 meters, excluding thermal infrared images. The data source of the present disclosure is not limited to the Landsat data source, and available to the data of most current remote sensing satellite multispectral image products. The data is required to be geometrically corrected and an average registration error between the data does not exceed 1 pixel, and the quality band used to extract the cloud mask is required to be included. Ground surface reflectance data or original Digital Number (DN) value data is used for a data processing level, and at least two images are required for a same area for processing.

Figure 1:
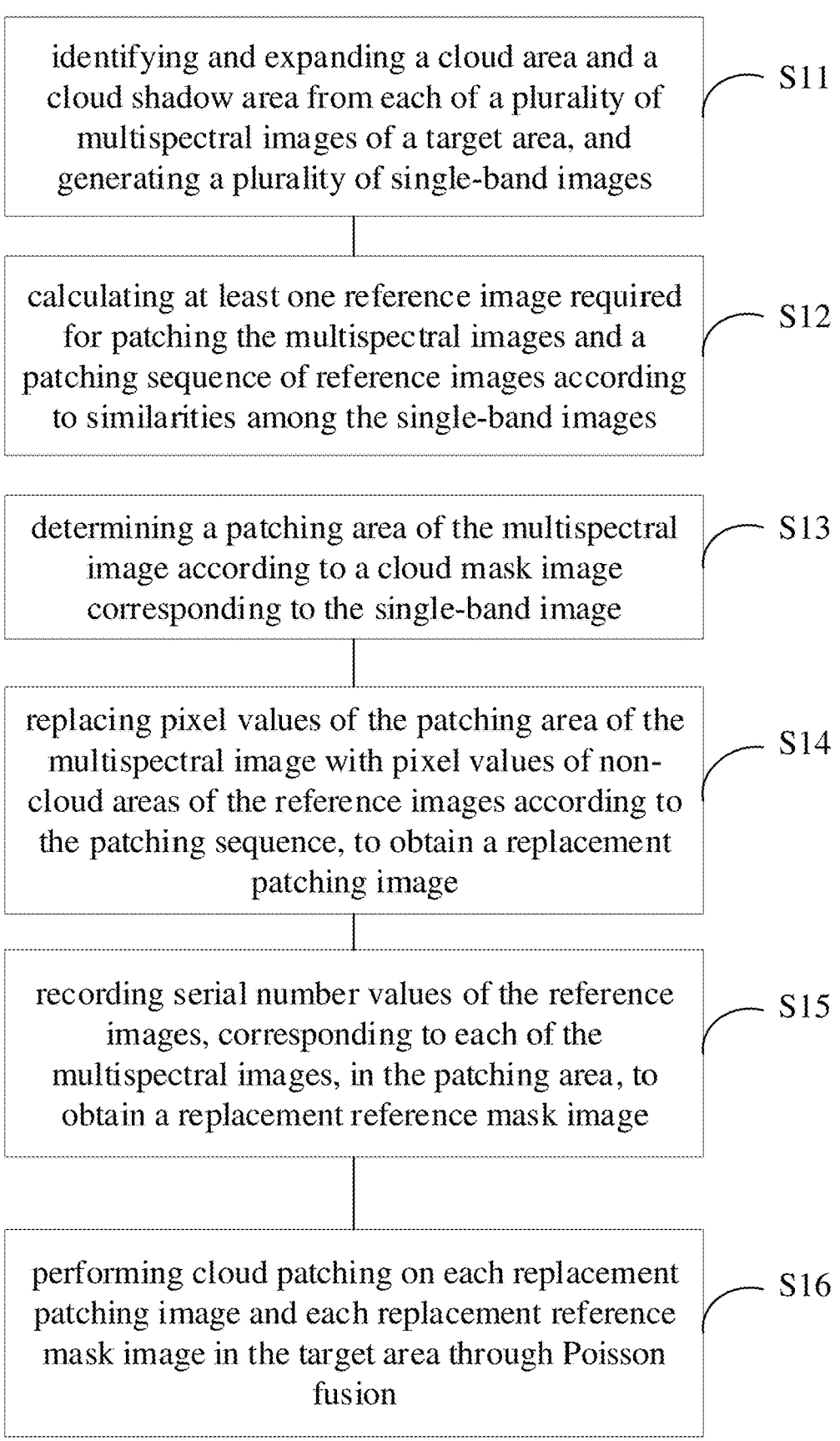
FIG. 1 is a flowchart of a method for patching a cloud area of a satellite image sequence according to an embodiment of the present disclosure.

FIG. 1 is a flowchart of patching a cloud area of a satellite image sequence according to an embodiment of the present disclosure. As shown in FIG. 1, the data storage method includes:

S11, identifying and expanding a cloud area and a cloud shadow area from each of a plurality of multispectral images of a target area, and generating a plurality of single-band images.

In an implementation, the identifying and expanding the cloud area and the cloud shadow area from each of the plurality of multispectral images of the target area, and generating the plurality of single-band images, includes:

identifying the cloud area and the cloud shadow area from the multispectral image, and generating a cloud mask image to be selected.

In an example, cloud mask extraction is mainly performed in this step, all multispectral images to be processed are categorized by area, and processes are performed area by area. For each image to be processed, a single-band cloud mask image is generated according to the cloud and cloud shadow area marked in the quality band included in the multispectral image data product.

The categorizing by area is to assign all images of a same flight band number to a same area. For example, the Landsat satellite flight band number adopts a Worldwide Reference System (WRS) reference system, a fixed ground reference grid formed by combining imaging characteristics of sub-satellite points. Two-dimensional coordinates of the WRS grid are identified by Path and Row, and data to be processed with the same Path and Row are classified into a same area. Naming rules of China's remote sensing satellite multispectral image data also include naming rules similar to Path and Row logos. The quality band is self-contained data of the multispectral image product data, and usually records marker information such as a cloud, a cloud shadow, a snow, a water body with different markers. The single-band cloud mask image is to re-simplify and mark the quality band data. Specifically, a background is marked with a value of 0, a clear ground surface is marked with a value of 1, a thick cloud and a cirrus cloud-high are marked with a value of 2, and a cloud shadow is marked with a value of 3, using 8-bit for recording.

S12, calculating at least one reference image required for patching the multispectral image and a patching sequence of reference images according to similarities among the single-band images, wherein the reference image is selected from one or more of the plurality of multispectral images.

In an implementation, a cloud area and a cloud shadow area, which are less than a first preset pixel value, in the cloud mask image to be selected are remarked as a clear ground surface, and a clear ground surface less than a second preset pixel value is remarked as a cloud area; and the remarked cloud area is inflated to a scale with a radius of no more than a first extended pixel, and the remarked cloud shadow area is inflated to a scale with a radius of no more than a second extended pixel, to obtain the cloud mask image.

In an example, cloud mask finishing is mainly performed in this step, and a morphological algorithm is used to expand a range of cloud and cloud shadow areas.

Expanding the range of the cloud and cloud shadow areas by using the morphological algorithm includes two steps: a first step is to reduce a level of discretization, specific method is to remark a cloud and cloud shadow, which is less than 4 pixels (a first preset pixel value), in the cloud mask as a clear ground surface value of 1, and remark a clear ground surface, which less than 4 pixels (a second preset pixel value), as a cloud value of 2; a second step is to inflate the cloud and cloud shadow areas, inflate the cloud area marked with the value of 2 to a scale with a radius of no more than 5 pixels (a first extended pixel), and inflate the cloud shadow area marked with the value of 3 to a scale with a radius of no more than 10 pixels (a second extended pixel).

S13, determining a patching area of the multispectral image according to a cloud mask image corresponding to the single-band image.

In an implementation, the calculating the at least one reference image required for patching the multispectral image and the patching sequence of the reference images according to the similarities among the single-band images, includes:

for the plurality of multispectral images and a plurality of cloud mask images, generating thumbnails of the single-band images and thumbnails of the cloud mask images based on a preset waveband by using a nearest neighbor interpolation method; and calculating the similarity among the single-band images according to the thumbnails of the single-band images.

In an implementation, the similarities are calculated by using a structural similarity index, an image acquisition time, and a cloud cover amount, wherein a calculation formula is as follows:

$$S_{ij} = a \cdot SSIM(I_i, I_j) + b \cdot \frac{1}{T_{ij}} + c \cdot \frac{C_j + C_{ij}}{2M_{ij}}$$

wherein a, b, and c are weighting coefficients, $S_{ij}$ is a similarity between thumbnails $I_i$ and $I_j$ of the single-band images, $SSIM(I_i, I_j)$ is a structural similarity index of the thumbnails $I_i$ and $I_j$, $T_{ij}$ is an acquisition time interval of the thumbnails $I_i$ and $I_j$, $C_j$ is a cloud cover amount of the thumbnail $I_j$, $C_{ij}$ is a common cloud area and cloud shadow area of the thumbnails $I_i$ and $I_j$, $M_i$ and $M_j$ are cloud mask thumbnails corresponding to the thumbnails $I_i$ and $I_j$ respectively, and $M_{ij}$ is a number of common non-zero pixels in $M_i$ and $M_j$.

In an implementation, a calculation formula of the structural similarity index is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

wherein $SSIM(I_i, I_j)$ is the structural similarity index of the thumbnails $I_i$ and $I_j$, C is a constant, $\mu_i$ and $\mu_j$ are mean values of pixel positions with a corresponding cloud mask area value of 1 of the thumbnails $I_i$ and $I_j$ respectively, $\sigma_i$ and $\sigma_j$ are standard deviations of the pixel positions, with the corresponding cloud mask area value of 1, of the thumbnails $I_i$ and $I_j$ respectively, $\sigma_{ij}$ is a covariance of the pixel positions, with the corresponding cloud mask area value of 1, of the thumbnails $I_i$ and $I_j$, and the cloud mask area value includes a cloud area value and a cloud shadow area value.

In an example, the patching area is mainly determined in this step by calculating the similarities, thumbnails are generated for all multispectral images in a same area and corresponding cloud mask images, and the thumbnails are used to quickly calculate the similarities among all multispectral images.

In a thumbnail generation process, for all multispectral images in the same area, only a single-band of blue light (0.450-0.515 μm) that is significantly affected by the atmosphere is selected to generate a thumbnail according to the nearest neighbor interpolation method, and a corresponding cloud mask image is used to generate a thumbnail according to the nearest neighbor interpolation method, scaled down to a quarter of an original size. Using the thumbnails to quickly calculate the similarities among all multispectral images is to use a structural similarity index (SSIM) to count a common clear ground surface area in two thumbnails, that is, pixel positions with corresponding cloud mask area values of 1. The similarity calculation is to obtain, for each multispectral image in a same area, a similarity between another image and this image according to the SSIM, an image acquisition time, and a cloud cover amount.

S14, replacing pixel values of the patching area of the multispectral image with pixel values of non-cloud areas of the reference images according to the patching sequence, to obtain a replacement patching image.

In an implementation, a marked area in the multispectral image corresponding to the single-band image is filled by using non-cloud area pixels in the thumbnails of the reference images in sequence, according to a ranking of similarities between the reference images and the single-band image, wherein the marked area is marked by the thumbnail of the cloud mask image corresponding to the single-band image.

Reference images used in a filling process and a corresponding patching sequence are recorded in a case where the marked area is filled or a filled area is no longer reduced.

In an example, the cloud patching reference data is mainly determined in this step, and for each multispectral image in the same area, the image thumbnail, the cloud mask thumbnail, and the ranking result of similarities are used to calculate a number of reference images and the patching sequence required to patch each image, to obtain a cloud patching reference lookup table.

Determining the cloud patching reference data is to: for a thumbnail of each multispectral image in the same area, the cloud and cloud shadow areas marked by the cloud mask thumbnail, fill with the non-cloud area pixels of the image thumbnails with high similarities in sequence, until the filling is completed or the filled area is no longer reduced. A number of reference images used, names and the patching sequence thereof are recorded. The cloud patching reference lookup table is used to record the number, the names and the patching sequence of reference images required for cloud patching of each multispectral image in the same area, and it is saved as an external text file.

S15, recording serial number values of the reference images, corresponding to each of the multispectral images, in the patching area, to obtain a replacement reference mask image.

In an example, direct replacement cloud patching is mainly performed in this step. For each multispectral image in the same area, for the cloud and cloud shadow areas to be patched, marked by the cloud mask, pixel values of the non-cloud areas of the reference images are replaced to the area to be patched band by band according to the reference image patching sequence determined by the cloud patching reference lookup table, so as to obtain the replacement patching image. At the same time, the serial number value of a reference image corresponding to each pixel in the patching area is recorded, to obtain the replacement reference mask image.

The direct replacement cloud patching is specifically for each multispectral image in the same area, for the cloud and cloud shadow areas to be patched, marked by the cloud mask, pixel values of the non-cloud areas of the reference images are replaced to the area to be patched band by band according to the reference image patching sequence determined by the cloud patching reference lookup table, so as to obtain the replacement patching image. The replacement reference mask image is a single-band 8-bit image, wherein the pixel value of 0 corresponds to a background value and a clear ground surface value marked by the cloud mask image, and the non-zero value corresponds to the cloud and cloud shadow areas in the cloud mask image. The non-zero value gets a value from a serial number value of a reference image used for patching the cloud area. For example, the value i indicates that the pixel cloud at this position comes from the ith reference image during patching, $i \in [1,n]$, wherein n is the number of reference images.

S16, performing cloud patching on each replacement patching image and each replacement reference mask image in the target area through Poisson fusion.

In an example, Poisson fusion cloud patching is mainly performed in this step. For each multispectral replacement patching image and each replacement reference mask image in the same area, Poisson fusion is used to complete cloud patching, to obtain a final multispectral cloud patching image.

The Poisson fusion cloud patching is consistent with Poisson fusion used in current seamless stitching of UAV images in a solution process. The difference lies in the calculation of a guide vector field used in the Poisson fusion solution. A guide vector value outside the patching area is 0, a guide vector value in the patching area is calculated based on a general Poisson fusion guide vector, and a boundary is divided into two types: a patching area boundary and a patching area inner boundary. The guide vector value of the patching area boundary is calculated based on the general Poisson fusion boundary conditions. For the guide vector value in a position of the patching area inner boundary, only adjacent pixel values from the same reference image are used for calculation, and 4-neighborhood or 8-neighborhood window filtering is used for implementation.

Compared with the existing technology, the present disclosure provides an automatic cloud patching solution for remote sensing satellite multispectral image data. High-quality cloud and cloud shadow cells extracted by using the quality band included in the multispectral data product are used to automatically generate the high-quality cloud mask with the finishing algorithm. The method of generating a thumbnail is used to quickly calculate the similarity of SSIM, and comprehensively determine the ranking of similarities of each image to other images according to the SSIM, the image acquisition time, and the cloud cover amount, so as to quickly determine the number of reference images and the ranking thereof required to patch each image. Finally, on the basis of simple and direct replacement and patching, the Poisson fusion is used to complete high-quality cloud patching. The algorithm is fully automated, human-computer interaction is not required in the entire cloud detection and cloud patching process, and the user only needs to perform a simple check on a final detection result. Key steps involved are implemented by mature algorithms, which have relatively high stability and applicability. Key technical support is provided for the automatic production of high-quality cloud patching data products for massive data of multispectral images represented by the Landsat series of satellites. This technology is a necessary data preprocessing process in the research of ground surface cover classification based on time series, and is used to eliminate the influence of the cloud and cloud shadow on the sequence spectra. Compared with previous simple filtering-based methods, this technology has significantly higher accuracy.

Several embodiments of the present disclosure are provided below to illustrate the specific implementation process of the present disclosure.

Embodiment 1

Figure 2:
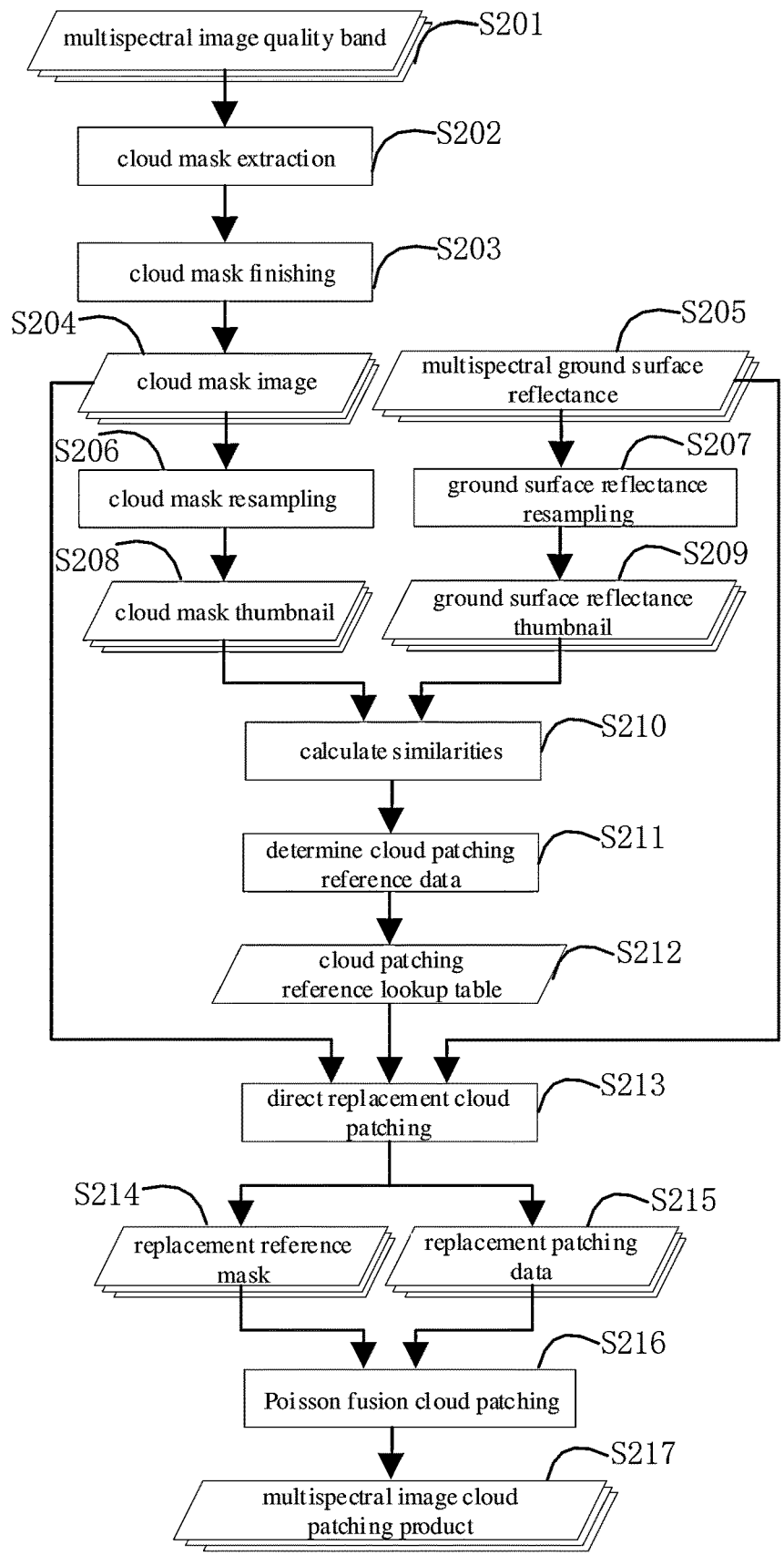
FIG. 2 is a flowchart of automatic cloud patching for a remote sensing satellite multispectral image according to an embodiment of the present disclosure.

In Embodiment 1, the process of realizing automatic cloud patching of remote sensing satellite multispectral images is shown in FIG. 2:

S201, multispectral image quality band (input data): the quality band is usually the self-contained data of the multispectral image product data, for example, the Landsat product data is in a *.tar.gz compressed package format, and quality band data obtained after decompression is a single-band 16-bit integer tif image, recording a cloud, a cloud shadow, a snow, a water body and other marker information with different bits, wherein original DN value data product is recorded in the *_bqa.tif file, and the ground surface reflectance data product is recorded in the *_pixel_qa.tif file. The quality band has the same image size, map projection, and coordinates as the original DN value data or ground surface reflectance data of the corresponding product, so the pixel position of the quality band corresponds to the image data. In terms of data version, the Pre Collection version before 2018 uses the Continuous Adaptive Ant Colony (CAAC) algorithm to detect the cloud and cloud shadow, and a new Collection 1 version after 2018 uses the C Function of the Mask (CFMask) algorithm to have better detection accuracy of the cloud and cloud shadow. Therefore, it is recommended to use new version data of Collection 1. For Chinese remote sensing satellite multispectral image product data, the marker of the quality band is similar to that of the Landsat product, but there are many differences between a specific data format and a marking rule.

In a case of actually processing the data, the cloud cover amount of some multispectral data is so large that it reaches 100%. The cloud patching of this kind of data is of little significance and cannot be completed. Therefore, in selecting the input data, data with a nominal cloud cover amount greater than 80% in an auxiliary file is excluded from processing.

S202, cloud mask extraction: the multispectral image product data is mostly in the *.tar.gz compressed package format, it is assumed that there are m compressed package data to be processed, the value of m may be massive data of the order of tens of millions, and the algorithm first obtains file paths of all m data through file query or list reading, and records the file paths in a memory, and then classifies all data by area, that is, all images with a same flight band number are classified into a same area. The Landsat satellite flight band number adopts the WRS reference system, a fixed ground surface reference grid formed by combining imaging characteristics of sub-satellite points. Two-dimensional coordinates of the WRS grid are identified by Path and Row. Path and Row numbers can be obtained from a name of a compressed package. For example, "119" after "LC08" in the file name "LC08119029201607110 1T1-SC20180904092105.tar.gz" is a Path value, and "029" is a Row value. To-be-processed data with a same Path and Row among the m data is classified into a same area. The Chinese remote sensing satellite multispectral image data products have a similar naming method, and the data may also be divided by area through the file names. The processing flow that the algorithm program completes at one time completes processing of data of the same area until all areas are processed.

It is assumed that a specific area includes a total of n data to be processed, the algorithm first automatically and quickly decompresses all the data to a hard disk in a parallel manner, and records decompressed quality data and a path name of the ground surface reflectance data. The cloud mask extraction is to simplify n quality data from 16-bit images to 8-bit images that only mark the cloud and cloud shadow. Specifically, the background is marked with a value of 0, the clear ground surface is marked with a value of 1, the cloud (Cloud, High Confidence Cirrus) is marked with a value of 2, and the cloud shadow (Cloud Shadow) is marked with a value of 3. After the cloud mask extraction is performed, n cloud mask tif format single-band 8-bit Byte images are obtained and saved to the hard disk.

S203, cloud mask finishing: it is not recommended to directly use the cloud mask image directly extracted by using the quality band for subsequent cloud patching. It is found in the experiment that the mask image extracted by using the quality band has two main problems: 1) Mask pixels are often too discrete at a cloud boundary and a thin cloud, and so on. This is mainly because the cloud detection algorithm is currently a pixel-by-pixel judgment based on a threshold, and does not consider the positional relationship of adjacent pixels. An overly discrete mask may reduce quality and stability of subsequent cloud patching and increase computational complexity; 2) Accuracy of mask pixels at the cloud boundary is not high, the detection accuracy of the cloud shadow is lower, and missing detection of the cloud and cloud shadow often occurs at the boundary. A purpose of the cloud mask finishing is to solve the above two problems.

Figure 3A:
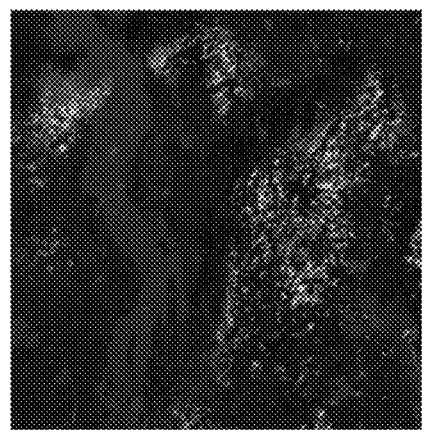
FIG. 3a-FIG. 3c are comparative example diagrams before and after cloud mask finishing according to an embodiment of the present disclosure.
Figure 3B:
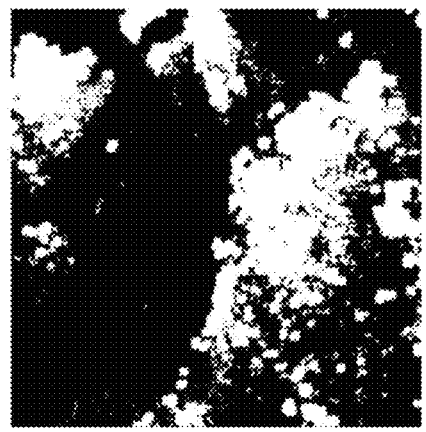
Figure 3C:
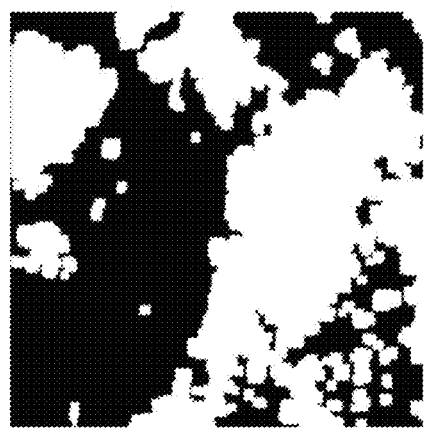

The cloud mask finishing mainly includes the following two steps:

① Reducing a level of discretization, wherein the specific method is to remark the cloud and cloud shadow with less than 4 pixels in the cloud mask as a clear ground surface value of 1, and remark the clear ground surface with less than 4 pixels as a cloud value of 2;

② Inflating the cloud and cloud shadow areas, inflating the cloud area marked with the value of 2 to a scale with a radius of no more than 5 pixels, and inflating the cloud shadow area marked with the value of 3 to a scale with a radius of no more than 10 pixels. Expanding the boundary can solve the problem of missing detection to a large extent. FIG. 3 is a comparison example before and after the cloud mask finishing, wherein FIG. 3a is the original image, FIG. 3b is a Quality Assessment (QA) band extraction cloud mask, and FIG. 3c is a cloud mask finishing result. From the comparison before and after the cloud mask finishing in FIG. 3a, FIG. 3b, and FIG. 3c, it can be seen that some small pixel fragments are removed, and the cloud shadow area inflates more than the cloud area.

For the n cloud mask tif images in the hard disk, the cloud mask finishing process is optimized by using the morphological algorithm, combined with a parallel processing strategy to achieve fast and automatic update of cloud mask images.

S204, the cloud mask image (an intermediate result): the cloud mask image is a single-band 8-bit Byte data type image with a same pixel size as each original image, the pixel value 0 represents the background, the pixel value 1 represents the clear ground surface, the pixel value 2 represents the cloud, the pixel value 3 represents the cloud shadow, and the cloud mask image is saved to the hard disk.

S206, resampling the cloud mask: in order to improve processing speeds of subsequent processing steps of ranking of similarities and determining the cloud patching reference data, the cloud mask is resampled, and a thumbnail is generated according to the nearest neighbor interpolation method, scaled down to a quarter of an original size. For n cloud mask tif images in the hard disk, parallel processing is used to quickly generate n cloud mask thumbnails to be saved to the hard disk.

S208, the cloud mask thumbnail (an intermediate result): the cloud mask thumbnail is a single-band 8-bit Byte data image with one-quarter size of the original image, the pixel value 0 represents the background, the pixel value 1 represents the clear ground surface, the pixel value 2 represents the cloud, the pixel value 3 represents the cloud shadow, and the cloud mask thumbnail is saved to the hard disk.

S205, multispectral ground surface reflectance (input data): the multispectral image product data is usually in the *.tar.gz compressed package format, and the ground surface reflectance data obtained after decompression are a plurality of single-band 16-bit signed integer tif images. Each tif image is recorded with bands in different spectral ranges from a visible light to a mid-wave infrared.

If the data is an original DN value, there are usually a plurality of single-band 16-bit unsigned integer tif images.

S207, resampling the ground surface reflectance: in order to improve processing speeds of subsequent processing steps of ranking of similarities and determining the cloud patching reference data, the single-band ground surface reflectance image of blue light (0.450-0.515 μm) strongly influenced by the atmosphere is resampled, and a thumbnail is generated according to the nearest neighbor interpolation method, scaled down to a quarter of an original size. For n ground surface reflectance tif images in the hard disk, parallel processing is used to quickly generate n ground surface reflectance thumbnails to be saved to the hard disk.

S209, the ground surface reflectance thumbnail (the intermediate result): the ground surface reflectance thumbnail is a single-band 16-bit integer data image of a quarter size of the ground surface reflectance image in the blue light (0.450-0.515 μm) band, and the ground surface reflectance thumbnail is saved to the hard disk.

S210, calculating similarity: the similarity calculation is to calculate, for each multispectral image in a same area, similarities between other images and this image according to the SSIM, an image acquisition time, and a cloud cover amount.

In calculation of the SSIM, thumbnails are used to reduce the amount of computation and improve the efficiency. For the n multispectral ground surface reflectance thumbnails in the hard disk and the corresponding cloud mask thumbnails, any two thumbnails $I_i$ and $I_j$, wherein i, j∈n, a common clear ground surface area in $I_i$ and $I_j$ is counted, that is, mean values $\mu_i$ and $\mu_j$, standard deviations $\sigma_i$ and $\sigma_j$, and a covariance $\sigma_{ij}$ of the pixel positions corresponding to the cloud mask area value of 1. An SSIM calculation formula of $I_i$ and $I_j$ is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

wherein C is a constant, for example, C=2, the purpose is to make a value range of the SSIM between −1 and 1. The larger the SSIM value is, the higher the similarity between the two images is.

The image acquisition time is recorded in the auxiliary file *_MTL.txt of the multispectral ground surface reflectance product data, and an acquisition time interval in days between the two thumbnails $I_i$ and $I_j$ is $T_{ij}$. The smaller the value of $T_{ij}$ is, the higher the similarity between the two images is.

The cloud cover amount is obtained by counting the number of pixels of the cloud and cloud shadow areas in cloud mask thumbnails $M_i$ and $M_j$ corresponding to thumbnails $I_i$ and $I_j$. The cloud cover amounts of $I_i$ and $I_j$ are respectively recorded as $C_i$ and $C_j$, and the common cloud and cloud shadow areas are recorded as $C_{ij}$. For the image $I_i$, the smaller the values of $C_j$ and $C_{ij}$ of the image $I_j$ are, the more conducive it is to patch the subsequent cloud area.

Finally, the similarity $S_{ij}$ calculation formula of $I_i$ to $I_j$ is as follows:

$$S_{ij} = a \cdot SSIM(I_i, I_j) + b \cdot \frac{1}{T_{ij}} + c \cdot \frac{C_j + C_{ij}}{2M_{ij}}$$

wherein $M_{ij}$ is the number of common non-zero pixels in the cloud mask thumbnails $M_i$ and $M_j$, including the clear ground surface and cloud area of the non-background area; a, b, and c are empirical constants, such as a=1, b=1, and c=1, and in this way, the larger the value of $S_{ij}$, the higher the similarity of $I_i$ to $I_j$.

S211, determining the cloud patching reference data: for each multispectral image in the same area, determine a number of reference images, file names, and a patching sequence required for cloud patching.

In calculation of the cloud patching reference data, thumbnails are used to reduce the amount of computation and improve efficiency. For the n multispectral ground surface reflectance images in the hard disk, it is recorded that the ith image is currently processed, then for the cloud mask thumbnail $M_i$, it is necessary to find an image j, with the largest similarity value to the ith image, in the remaining images as the first reference image, that is, the similarity $S_{ij}^{max}$=max{$S_{ij}$,i≠j,j∈n}. The virtual cloud patching is to use the cloud mask thumbnail $M_j$ of the reference image to fill the clear ground surface in $M_j$ to the cloud and cloud shadow areas of $M_i$ in a corresponding geographic position, that is, for the so-called pixel point of $M_i$, if the value is greater than 1, and the value of the position in $M_j$ is equal to 1, then the value of the position of $M_i$ is set to 1. And so on, until patching of the cloud area in the cloud mask $M_i$ is completed, or all reference images are used up. The number, the file names, and the patching sequence of reference images required to patch the ith image are recorded, and so on, until the reference images used for cloud patching are determined for all n images.

It should be noted that in the actual data processing process, due to the complexity of the cloud detection results, real data often rarely fills all the cloud areas in the cloud mask, and it is more about processing until the filled area is no longer reduced, at this time the remaining areas are usually some highlighted ground surfaces that are falsely detected as clouds in the cloud masks of all reference images. Generally, the number of reference images required to patch an image is about 5.

S212, the cloud patching reference lookup table (the intermediate result): record the number, the file names, and the patching sequence of reference images required for cloud patching of each multispectral image in the same area, and save them as an external text file.

S213, the direct replacement cloud patching is for each multispectral image in the same area, for the cloud and cloud shadow areas to be patched, marked by the cloud mask, pixel values of the non-cloud areas of the reference images are replaced to the area to be patched band by band according to the reference image patching sequence determined by the cloud patching reference lookup table, so as to obtain the replacement patching image. At the same time, in order to indicate the source of patching of each pixel in the area to be patched in the image, a replacement reference mask is recorded.

Figure 5A:
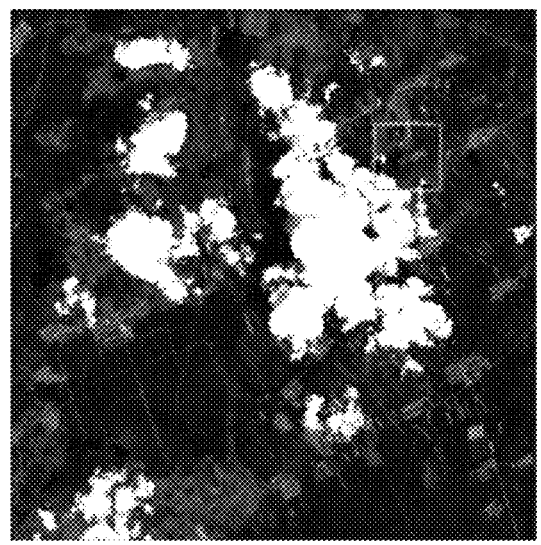
FIG. 5a-FIG. 5d are example diagrams of results of direct replacement cloud patching and Poisson fusion cloud patching according to an embodiment of the present disclosure.
Figure 5B:
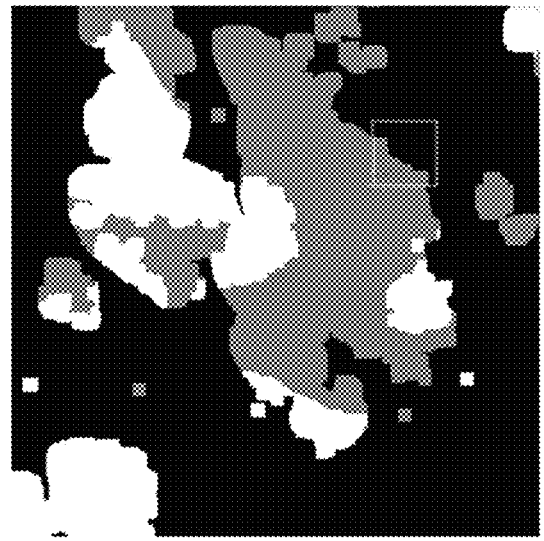
Figure 5C:

The current patching image is recorded as T, a corresponding cloud mask is $M^T$, the patching reference image is $R_i$, the reference image cloud mask is $M_i^R$, i∈[1, m], and m is a number of reference images. $T_j(x, y)$ represents a pixel at the pixel position of (x, y) of the jth band of the patching image, j∈[1, 1)], and b is a number of bands. The replacement reference mask is recorded as $M_{ref}^T$. A process of the direct replacement cloud patching is as follows:

for (i=0, km, i++) // loop each reference image
        for (j=0, j<b, j++) // loop each band
        if ($M^T$(x,y)>1 && $M_i^R$(x, y)=1) // if the current pixel is to be patched in T, and is a clear ground surface in $R_i$
            $T_j$(x, y)=$R_i$(x, y); // replace a pixel value in T with a pixel value in $R_i$
            $M_{ref}^T$(x, y)=i; // mark the replacement reference mask pixel value as the reference image number FIG. 5a shows an original image of an example diagram of results of direct replacement cloud patching and Poisson fusion cloud patching according to an embodiment of the present disclosure, and FIG. 5b shows a replacement reference mask example of an example diagram of results of direct replacement cloud patching and Poisson fusion cloud patching according to an embodiment of the present disclosure. Different gray levels in the patching area represent different reference images. FIG. 5c shows a result example of direct replacement cloud patching of an example diagram of results of direct replacement cloud patching and Poisson fusion cloud patching according to an embodiment of the present disclosure. It can be seen that the direct replacement result has obvious visual radiation differences at the boundary of the patching area and the boundaries of different reference images inside the patching area, so subsequent cloud patching based on Poisson fusion is required to eliminate the radiation differences.

S214, the replacement reference mask (the intermediate result) is used to indicate a patching source of each pixel in an area to be patched in the image, which is a single-band 8-bit image with a same size as the cloud mask, wherein the pixel value of 0 corresponds to a background value and a clear ground surface value marked by the cloud mask image, and the non-zero value corresponds to the cloud and cloud shadow areas in the cloud mask image. The non-zero value gets a value from a serial number value of a reference image used for patching the cloud area. For example, the value i indicates that the pixel cloud at this position comes from the ith reference image during patching, i∈[1,m], wherein m is the number of reference images.

The replacement reference mask of each image and the list of used reference image file names are provided to the user as auxiliary files of the final cloud patching product data, which is convenient for the user to trace the patching area of each image and the patching source of each pixel. This is necessary for subsequent possible ground surface cover change monitoring studies.

S215, the replacement patching data (the intermediate result): same as the format of the original multispectral ground surface reflectance data, the difference is that pixel values of the cloud and cloud shadow areas to be patched marked by the cloud mask are replaced with pixel values from different reference images.

S216, Poisson fusion cloud patching: for each multispectral replacement patching image and each replacement reference mask image in the same area, Poisson fusion is used to complete cloud patching to obtain a final multispectral cloud patching image.

Poisson fusion is currently widely used in the field of seamless mosaic of UAV images. The problem solved by the seamless mosaic of UAV images is to equalize the color and eliminate the seams among all graphics. After the operation is completed, all pixel values of the result image will change, and the entire image will achieve a uniformly enhanced color performance. The difference is that the Poisson fusion used in this algorithm requires only the pixel values of the patching area to be processed, pixel values outside the patching area remain unchanged, and boundaries between different reference image pixel areas in the patching area are required to be eliminated.

Figure 4:
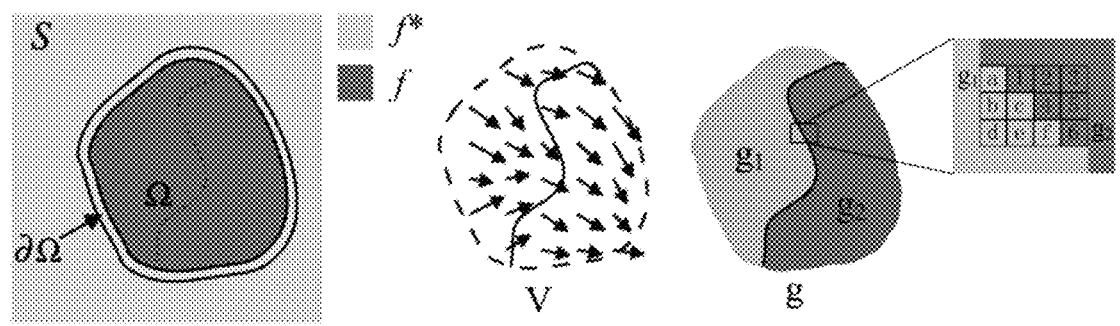
FIG. 4 is a schematic diagram of a cloud patching algorithm principle of Poisson fusion according to an embodiment of the present disclosure.

FIG. 4 is a schematic diagram of the algorithm principle of the Poisson fusion cloud patching used in this algorithm. The following describes the algorithm implementation principle of the Poisson fusion cloud patching with reference to the definitions in FIG. 4. S denotes the target image for cloud patching, $\Omega$ denotes the cloud and cloud shadow areas to be patched, and the boundary pixel of the area is denoted as $\partial\Omega$, f* denotes a scalar function of S minus the range of $\Omega$, f denotes a unknown scalar function of the range of $\Omega$, g denotes a scalar function of the pixel value of the patching area obtained through the direct replacement method, wherein $g_1$ and $g_2$ represent coming from different reference images, so g is represented in the form of a piecewise function, and there is a complex boundary between $g_1$ and $g_2$, and the guide vector field obtained by calculating from g is denoted as V.

The purpose of Poisson fusion is to solve f, make transition for optimal consistency between the patching area and S, and minimize the internal gradient change of $\Omega$ in operation.

$$\nabla\cdot = \left[\frac{\partial\cdot}{\partial x}, \frac{\partial\cdot}{\partial y}\right]$$

denotes the gradient operation, then $$\min_f \int\int_\Omega |\nabla f|^2,$$

and there is $f|_{\partial\Omega}=f^*|_{\partial\Omega}$ at the boundary.

$$\Delta\cdot = \left[\frac{\partial^2\cdot}{\partial x^2}, \frac{\partial^2\cdot}{\partial y^2}\right]$$

denotes the Laplacian operator, which takes the minimum value in a case where a second-order partial derivative of the gradient is 0, Lagrangian Equations, $\Delta f|_\Omega=0$, represent the minimization problem of the guide vector field, and $$\min_f \int\int_\Omega |\nabla f - \nabla|^2,$$

whose solution is a unique solution of Poisson Equation with Dirichlet Boundary Conditions, namely, $\Delta f|_\Omega=\text{div}V$, there is also $f|_{\partial\Omega}=f^*|_{\partial\Omega}$ at the boundary, wherein $$divV = \frac{\partial u}{\partial x} + \frac{\partial v}{\partial y}$$

is the divergence of V=(u, v).

The purpose of Poisson fusion is to solve a correction function $\tilde{f}$ inside $\Omega$, so that $f^*=g+\tilde{f}$. Therefore, the correction $\tilde{f}$ required inside $\Omega$ is used as the boundary condition by using $\partial\Omega$ on the boundary and the error f*−g to interpolate into $\Omega$ for solving. That is $\Delta\tilde{f}|_\Omega=0$, and there is $\tilde{f}|_{\partial\Omega}=(f^*-g)|_{\partial\Omega}$ at the boundary.

The Poisson fusion solution process used in this algorithm may still be implemented using the programming of seamless mosaic of UAV images, which is involved in many open source projects at present, and there are various accelerated optimization versions to choose from. The difference is the solution of the guide vector domain V. The calculation method of V in this algorithm is slightly more complicated. The unified boundary type of Poisson fusion of UAV images is refined and divided into two types: the boundary of the patching area and the patching area inner boundary.

The patching area boundary, namely, $\partial\Omega$, the value of V outside the patching area is 0, the value of V of the patching area boundary is calculated according to the general Poisson fusion boundary conditions, and the value of V in the patching area is calculated according to the general Poisson fusion guide vector field. In the specific programming implementation, a manner of 4-neighborhood or 8-neighborhood window filtering is used. For example, the value of V in the 4-neighborhood patching area is calculated as:

$$V(x,y)=g(x+1,y)+g(x,y+1)+g(x-1,y)+g(x,y-1)-4\times g(x,y)$$

However, the value of V in the 8-neighborhood patching area is calculated as:

$$V(x,y)=g(x+1,y)+g(x,y+1)+g(x-1,y)+g(x,y-1)+g(x+1,y+1)+g(x-1,y+1)+g(x+1,y-1)+g(x-1,y-1)-8\times g(x,y)$$

For the patching area inner boundary, that is, the boundary between different reference images $g_1$ and $g_2$, see FIG. 4. For the pixel value V at the patching area inner boundary, only adjacent pixel values from the same reference image are used for calculation. For example, in using the 4-neighborhood window for filtering, the calculation formulas for the value V of the pixel point c in the area $g_1$ and the value V of the pixel point 4 in the area $g_2$ in FIG. 4 are respectively:

$$V(c)=g_1(b)+g_1(e)-2\times g_1(c)$$

$$V(4)=g_2(2)+g_2(5)-2\times g_2(4)$$

However, in using the 8-neighborhood window for filtering, the calculation formulas for the value V of the pixel point c in the area $g_1$ and the value V of the pixel point 4 in the area $g_2$ in FIG. 4 are respectively:

$$V(c)=g_1(a)+g_1(b)+g_1(d)+g_1(e)+g_1(f)-5\times g_1(c)$$

$$V(4)=g_2(1)+g_2(2)+g_2(3)+g_2(5)+g_2(6)-5\times g_2(4)$$

Through the customization of the guide vector domain, the algorithm may well maintain the spectral characteristics of the patching area, and may not change the pixel value of the unpatched area, which is very important for the subsequent remote sensing classification research of the data.

Figure 5D:
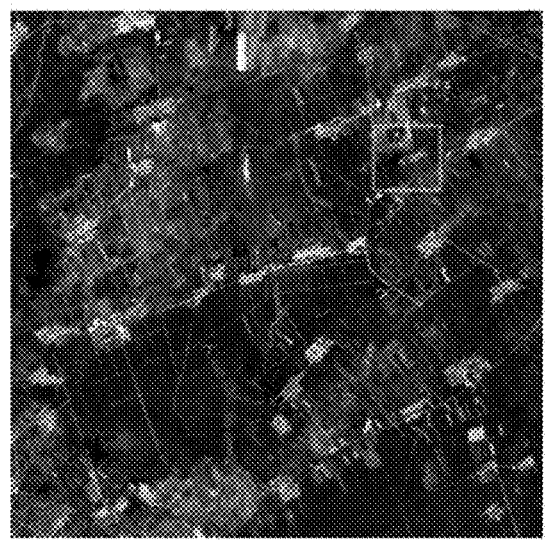

FIG. 5d shows a result example of Poisson fusion cloud patching of an example diagram of results of direct replacement cloud patching and Poisson fusion cloud patching according to an embodiment of the present disclosure. It can be seen that Poisson fusion-based cloud patching effectively eliminates the obvious visual radiation differences of the direct replacement result at the boundary of the patching area and the boundaries of different reference images inside the patching area.

Figure 6:
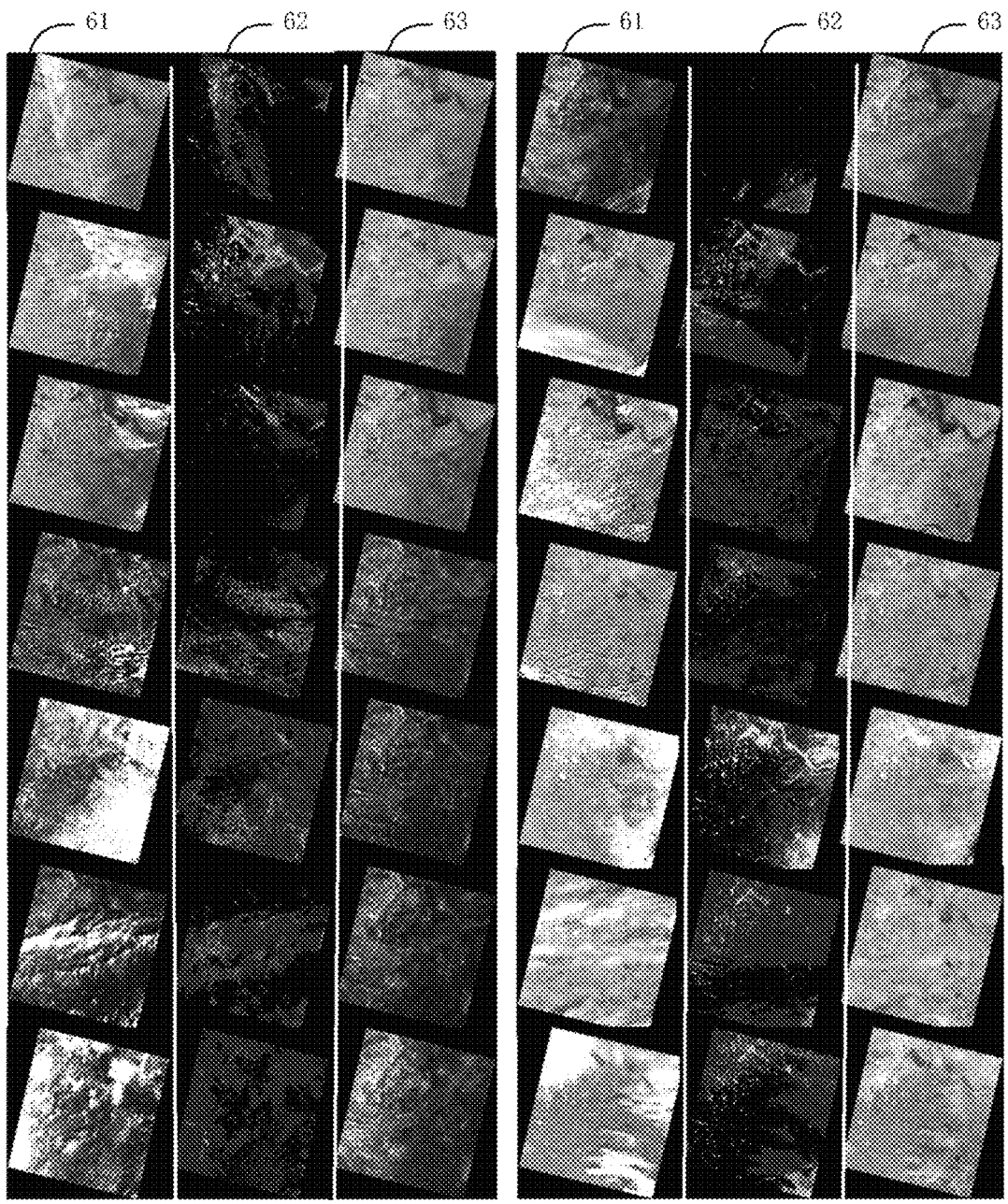
FIG. 6 is an example diagram of before and after multi-image cloud patching in a same area and a replaced patching reference mask according to an embodiment of the present disclosure.

S217, the multispectral image cloud patching product (output data): the final cloud patching product data is the same as the format of the original multispectral ground surface reflectance data, the difference is that pixel values of the cloud and cloud shadow areas to be patched, marked by the cloud mask are replaced with pixel values from different reference images, and spectral correction is completed through Poisson fusion. Each of cloud patching product data is placed in a different folder named by Path, Row and an original file name by area, for example, ../119/029/ LC081190292013041401T1-SC20180831224406/. Currently, each cloud patching product includes 7 files, including:

sr cr.tif is the cloud patching image, including all bands, LZW compression storage, and * is the file name of original data sr crm.tif is the replacement reference mask, single-band byte LZW compression storage, and the pixel value corresponds to the reference image number sr cr.txt text file records cloud cover statistics and the patching image serial number and the name used by the current image .jpg is the jpg thumbnails of the patching image and the mask image, MTL/ANG.txt is a copy of an original auxiliary file of the C1 product The C++ algorithm example of the present disclosure has been implemented on the PC platform. The validity and robustness of the algorithm have been verified through a large amount of experimental data in the early stage. At present, the example has been used for the production of cloud patching products with massive data, and the cloud patching of the first version of the Landsat Collection 1 version of the ground surface reflectance data has been completed for 5 consecutive years from 2013 to 2017 in regions of China, which completely covered China, including 528 flight band numbers, and the total data volume has exceeded 50,000, about 30 TB. FIG. 6 is an example diagram before and after cloud patching and the replacement patching reference masks for some images of the Northeast region of China (path:119/row:029), wherein the column 61 corresponds to the original images, the column 62 corresponds to the replacement patching reference masks, and the column 63 corresponds to the patching result images.

Figure 7:
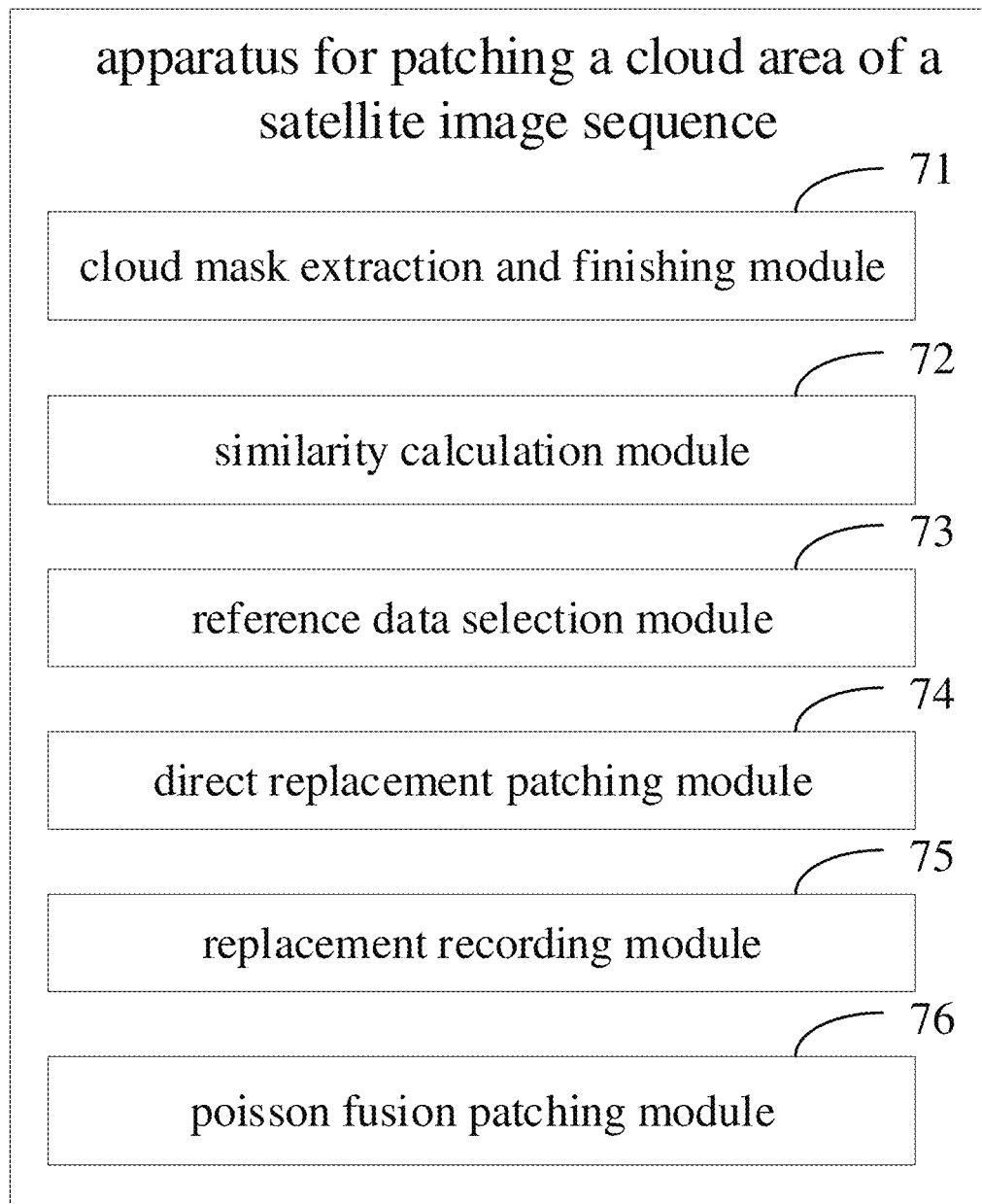
FIG. 7 is a structural block diagram of an apparatus for patching a cloud area of a satellite image sequence according to an embodiment of the present disclosure.

FIG. 7 is a structural block diagram of an apparatus for patching a cloud area of a satellite image sequence according to an embodiment of the present disclosure.

As shown in FIG. 7, the apparatus for patching a cloud area of a satellite image sequence includes:

a cloud mask extraction and finishing module 71 configured for identifying and expanding a cloud area and a cloud shadow area from each of a plurality of multispectral images of a target area, and generating a plurality of single-band images;

a similarity calculation module 72 configured for calculating at least one reference image required for patching the multispectral images and a patching sequence of reference images according to similarities among the single-band images, wherein the reference image is selected from one or more of the plurality of multispectral images;

a reference data selection module 73 configured for determining a patching area of the multispectral image according to a cloud mask image corresponding to the single-band image;

a direct replacement patching module 74 configured for replacing pixel values of the patching area of the multispectral image with pixel values of non-cloud areas of the reference images according to the patching sequence, to obtain a replacement patching image;

a replacement recording module 75 configured for recording serial number values of the reference images, corresponding to each of the multispectral images, in the patching area, to obtain a replacement reference mask image; and a Poisson fusion patching module 76 configured for performing cloud patching on the replacement patching image and the replacement reference mask image through Poisson fusion.

Figure 8:
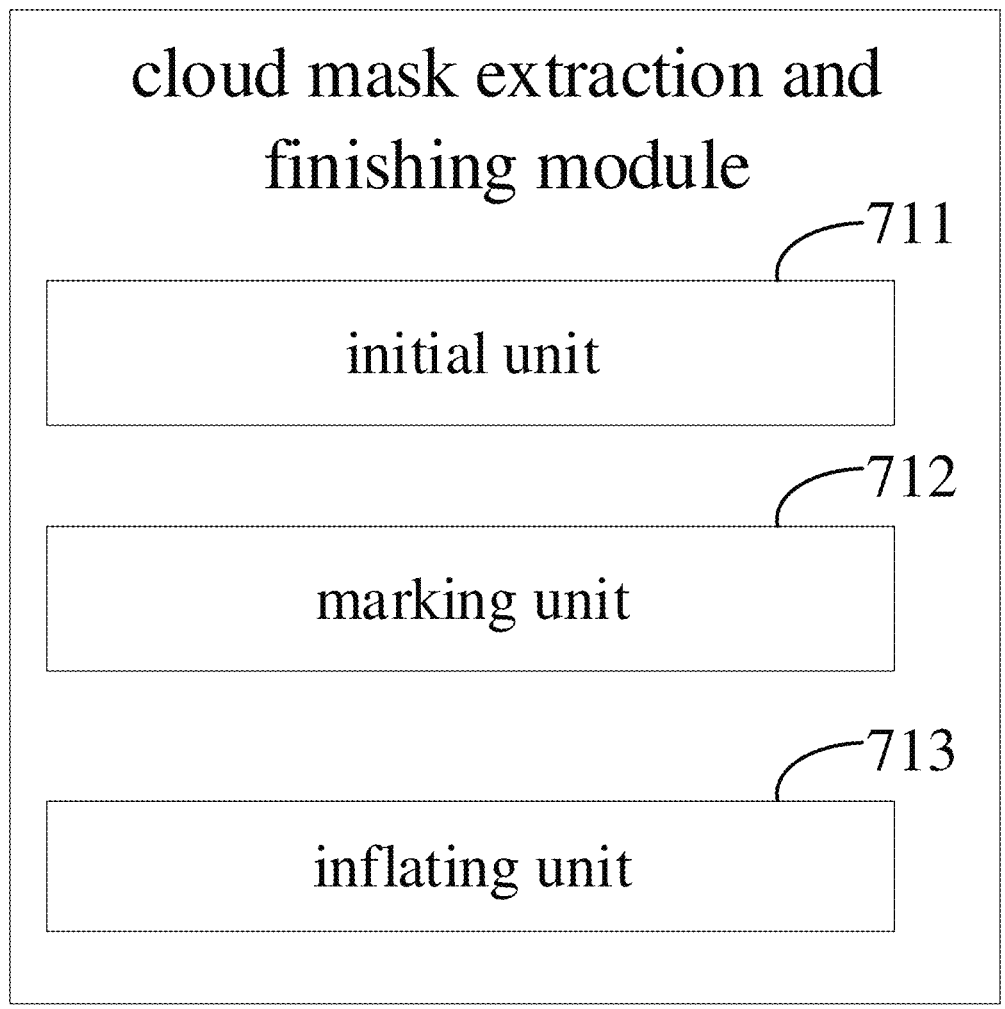
FIG. 8 is a structural block diagram of a cloud mask extraction and finishing module according to an embodiment of the present disclosure.

FIG. 8 is a structural block diagram of a cloud mask extraction and finishing module according to an embodiment of the present disclosure.

As shown in FIG. 8, the cloud mask extraction and finishing module 71 includes:

an initial unit 711 configured for identifying the cloud area and the cloud shadow area from the multispectral image, and generating a cloud mask image to be selected;

a marking unit 712 configured for remarking a cloud area and a cloud shadow area, which are less than a first preset pixel value, in the cloud mask image to be selected as a clear ground surface, and remarking a clear ground surface, which is less than a second preset pixel value, as the cloud area; and an inflating unit 713 configured for inflating the remarked cloud area to a scale with a radius of no more than a first extended pixel, and inflating the remarked cloud shadow area to a scale with a radius of no more than a second extended pixel, to obtain the cloud mask image.

Figure 9:
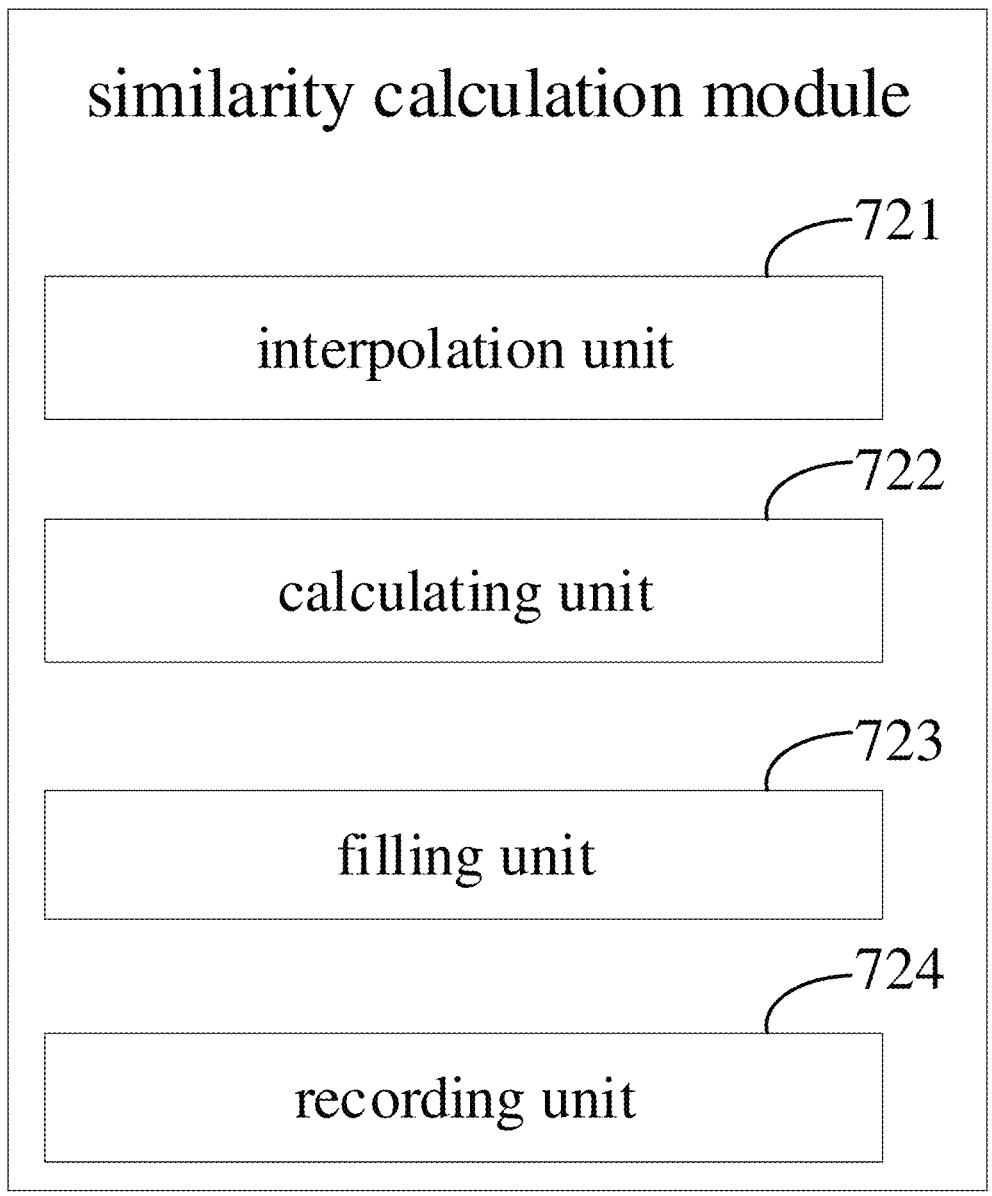
FIG. 9 is a structural block diagram of a similarity calculation module according to an embodiment of the present disclosure.

FIG. 9 is a structural block diagram of a similarity calculation module according to an embodiment of the present disclosure.

As shown in FIG. 9, the similarity calculation module 72 includes:

an interpolation unit 721 configured for: for the plurality of multispectral images and a plurality of cloud mask images, generating thumbnails of the single-band images and thumbnails of the cloud mask images based on a preset waveband by using a nearest neighbor interpolation method;

a calculating unit 722 configured for calculating the similarities among the single-band images according to the thumbnails of the single-band images;

a filling unit 723 configured for filling a marked area in the multispectral image corresponding to the single-band image by using non-cloud area pixels in thumbnails of the reference images in sequence, according to a ranking of similarities between the reference images and the single-band image, wherein the marked area is marked by the thumbnail of the cloud mask image corresponding to the single-band image; and a recording unit 724 configured for recording the reference images used in a filling process and a corresponding patching sequence in a case where the marked area is filled or a filled area is no longer reduced.

Figure 10:
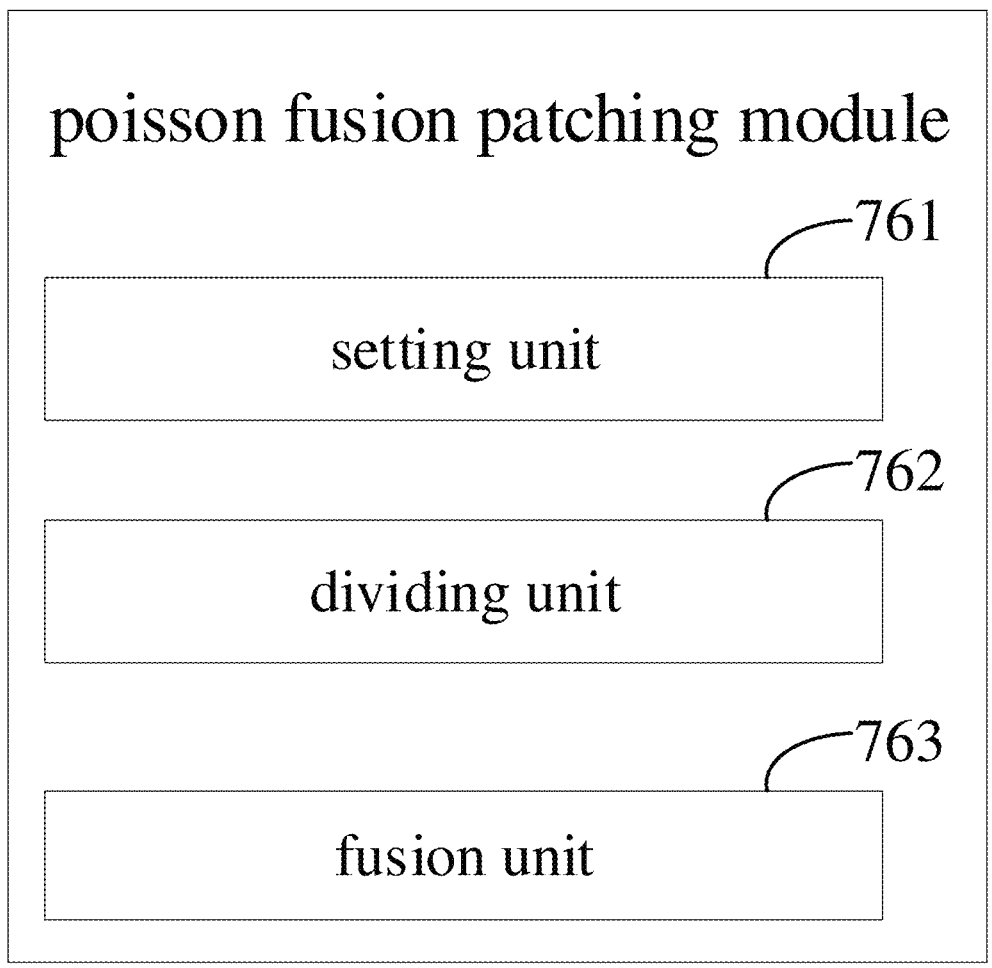
FIG. 10 is a structural block diagram of a Poisson fusion patching module according to an embodiment of the present disclosure.

FIG. 10 is a structural block diagram of a Poisson fusion patching module according to an embodiment of the present disclosure.

As shown in FIG. 10, the Poisson fusion patching module 76 includes:

a setting unit 761 configured for setting a guide vector value outside the patching area of the multispectral image to 0;

a dividing unit 762 configured for dividing a boundary of the multispectral image into a patching area boundary and a patching area inner boundary; and a fusion unit 763 configured for: for guide vector values at the patching area inner boundary, using adjacent pixel values from a same reference image.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN) and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-mentioned implementations are not to be construed as limiting the scope of the present disclosure. It will be apparent to those skilled in the art that various modifications, combinations, sub-combinations and substitutions are possible, depending on design requirements and other factors. Any modifications, equivalent substitutions and improvements, and the like within the spirit and principle of the present disclosure are intended to be included within the scope of the present disclosure.

What is claimed is:

1. A method for patching a cloud area of a satellite image sequence, comprising:
identifying and expanding a cloud area and a cloud shadow area from each of a plurality of multispectral images of a target area, and generating a plurality of single-band images;
calculating at least one reference image required for patching the multispectral image and a patching sequence of reference images according to similarities among the single-band images, wherein the reference image is selected from one or more of the plurality of multispectral images;
determining a patching area of the multispectral image according to a cloud mask image corresponding to the single-band image;
replacing pixel values of the patching area of the multispectral image with pixel values of non-cloud areas of the reference images according to the patching sequence, to obtain a replacement patching image;
recording serial number values of the reference images, corresponding to each of the multispectral images, in the patching area, to obtain a replacement reference mask image; and
performing cloud patching on each replacement patching image and each replacement reference mask image in the target area through Poisson fusion,
wherein the performing cloud patching on each replacement patching image and each replacement reference mask image in the target area through Poisson fusion, comprises:
setting a guide vector value outside the patching area of the multispectral image to 0;
dividing a boundary of the multispectral image into a patching area boundary and a patching area inner boundary; and
for guide vector values at the patching area inner boundary, using adjacent pixel values from a same reference image.

2. The method of claim 1, wherein the identifying and expanding the cloud area and the cloud shadow area from each of the plurality of multispectral images of the target area, and generating the plurality of single-band images, comprises:
identifying the cloud area and the cloud shadow area from the multispectral image, and generating a cloud mask image to be selected;
remarking a cloud area and a cloud shadow area, which are less than a first preset pixel value, in the cloud mask image to be selected as a clear ground surface, and remarking a clear ground surface, which is less than a second preset pixel value, as the cloud area; and
inflating the remarked cloud area to a scale with a radius of no more than a first extended pixel, and inflating the remarked cloud shadow area to a scale with a radius of no more than a second extended pixel, to obtain the cloud mask image.

3. The method of claim 1, wherein the calculating the at least one reference image required for patching the multispectral image and the patching sequence of the reference images according to the similarities among the single-band images, comprises:
for the plurality of multispectral images and a plurality of cloud mask images, generating thumbnails of the single-band images and thumbnails of the cloud mask images based on a preset waveband by using a nearest neighbor interpolation method;
calculating the similarities among the single-band images according to the thumbnails of the single-band images;
filling a marked area in the multispectral image corresponding to the single-band image by using non-cloud area pixels in thumbnails of the reference images in sequence, according to a ranking of similarities between the reference images and the single-band image, wherein the marked area is marked by the thumbnail of the cloud mask image corresponding to the single-band image; and
recording the reference images used in a filling process and a corresponding patching sequence in a case where the marked area is filled or a filled area is no longer reduced.

4. The method of claim 3, wherein the calculating the similarities among the single-band images according to the thumbnails of the single-band images, comprises:
calculating the similarities by using a structural similarity index, an image acquisition time, and a cloud cover amount, wherein a calculation formula is as follows:

$$S_{ij} = a \cdot SSIM(I_i, I_j) + b \cdot \frac{1}{T_{ij}} + c \cdot \frac{C_j + C_{ij}}{2M_{ij}}$$

wherein a, b, and c are weighting coefficients, $S_{ij}$ is a similarity between thumbnails $I_i$ and $I_j$ of the single-band images, $SSIM(I_i, I_j)$ is a structural similarity index of the thumbnails $I_i$ and $I_j$, $T_{ij}$ is an acquisition time interval of the thumbnails $I_i$ and $I_j$, $C_j$ is a cloud cover amount of the thumbnail $I_j$, $C_{ij}$ is a common cloud area and cloud shadow area of the thumbnails $I_i$ and $I_j$, $M_i$ and $M_j$ are cloud mask thumbnails corresponding to the thumbnails $I_i$ and $I_j$ respectively, and $M_{ij}$ is a number of common non-zero pixels in $M_i$ and $M_j$.

5. The method of claim 4, wherein a calculation formula of the structural similarity index is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

wherein SSIM ($I_i$, $I_j$) is the structural similarity index of the thumbnails $I_i$ and $I_j$, C is a constant, $\mu_i$ and $\mu_j$ are mean values of pixel positions, with a corresponding cloud mask area value of 1, of the thumbnails $I_i$ and $I_j$ respectively, $\sigma_i$ and $\sigma_j$ are standard deviations of the pixel positions, with the corresponding cloud mask area value of 1, of the thumbnails $I_i$ and $I_j$ respectively, $\sigma_{ij}$ is a covariance of the pixel positions, with the corresponding cloud mask area value of 1, of the thumbnails $I_i$ and $I_j$, and the cloud mask area value comprises a cloud area value and a cloud shadow area value.

6. An apparatus for patching a cloud area of a satellite image sequence, comprising:
one or more processors; and
a storage apparatus configured for storing one or more programs, wherein
the one or more programs, when executed by the one or more processors, cause the one or more processors to implement operations of:
identifying and expanding a cloud area and a cloud shadow area from each of a plurality of multispectral images of a target area, and generating a plurality of single-band images;

calculating at least one reference image required for patching the multispectral image and a patching sequence of reference images according to similarities among the single-band images, wherein the reference image is selected from one or more of the plurality of multispectral images;

determining a patching area of the multispectral image according to a cloud mask image corresponding to the single-band image;

replacing pixel values of the patching area of the multispectral image with pixel values of non-cloud areas of the reference images according to the patching sequence, to obtain a replacement patching image;

recording serial number values of the reference images, corresponding to each of the multispectral images, in the patching area, to obtain a replacement reference mask image; and performing cloud patching on each replacement patching image and each replacement reference mask image in the target area through Poisson fusion, wherein the performing cloud patching on each replacement patching image and each replacement reference mask image in the target area through Poisson fusion, comprises:

setting a guide vector value outside the patching area of the multispectral image to 0;

dividing a boundary of the multispectral image into a patching area boundary and a patching area inner boundary; and for guide vector values at the patching area inner boundary, using adjacent pixel values from a same reference image.

7. The apparatus of claim 6, wherein the identifying and expanding the cloud area and the cloud shadow area from each of the plurality of multispectral images of the target area, and generating the plurality of single-band images, comprises:

identifying the cloud area and the cloud shadow area from the multispectral image, and generating a cloud mask image to be selected;

remarking a cloud area and a cloud shadow area, which are less than a first preset pixel value, in the cloud mask image to be selected as a clear ground surface, and remarking a clear ground surface, which is less than a second preset pixel value, as the cloud area; and inflating the remarked cloud area to a scale with a radius of no more than a first extended pixel, and inflating the remarked cloud shadow area to a scale with a radius of no more than a second extended pixel, to obtain the cloud mask image.

8. The apparatus of claim 6, wherein the calculating the at least one reference image required for patching the multispectral image and the patching sequence of the reference images according to the similarities among the single-band images, comprises:

for the plurality of multispectral images and a plurality of cloud mask images, generating thumbnails of the single-band images and thumbnails of the cloud mask images based on a preset waveband by using a nearest neighbor interpolation method;

calculating the similarities among the single-band images according to the thumbnails of the single-band images;

filling a marked area in the multispectral image corresponding to the single-band image by using non-cloud area pixels in thumbnails of the reference images in sequence, according to a ranking of similarities between the reference images and the single-band image, wherein the marked area is marked by the thumbnail of the cloud mask image corresponding to the single-band image; and recording the reference images used in a filling process and a corresponding patching sequence in a case where the marked area is filled or a filled area is no longer reduced.

9. The apparatus of claim 8, wherein the calculating the similarities among the single-band images according to the thumbnails of the single-band images, comprises:

calculating the similarities by using a structural similarity index, an image acquisition time, and a cloud cover amount, wherein a calculation formula is as follows:

$$S_{ij} = a \cdot SSIM(I_i, I_j) + b \cdot \frac{1}{T_{ij}} + c \cdot \frac{C_j + C_{ij}}{2M_{ij}}$$

wherein a, b, and c are weighting coefficients, $S_{ij}$ is a similarity between thumbnails $I_i$ and $I_j$ of the single-band images, SSIM ($I_i$, $I_j$) is a structural similarity index of the thumbnails $I_i$ and $I_j$, $T_{ij}$ is an acquisition time interval of the thumbnails $I_i$ and $I_j$, $C_j$ is a cloud cover amount of the thumbnail $I_j$, $C_{ij}$ is a common cloud area and cloud shadow area of the thumbnails $I_i$ and $I_j$, $M_i$ and $M_j$ are cloud mask thumbnails corresponding to the thumbnails $I_i$ and $I_j$ respectively, and $M_{ij}$ is a number of common non-zero pixels in $M_i$ and $M_j$.

10. The apparatus of claim 9, wherein a calculation formula of the structural similarity index is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

wherein SSIM ($I_i$, $I_j$) is the structural similarity index of the thumbnails $I_i$ and $I_j$, C is a constant, $\mu_i$ and $\mu_j$ are mean values of pixel positions, with a corresponding cloud mask area value of 1, of the thumbnails $I_i$ and $I_j$ respectively, $\sigma_i$ and $\sigma_j$ are standard deviations of the pixel positions, with the corresponding cloud mask area value of 1, of the thumbnails $I_i$ and $I_j$ respectively, $\sigma_{ij}$ is a covariance of the pixel positions, with the corresponding cloud mask area value of 1, of the thumbnails $I_i$ and $I_j$, and the cloud mask area value comprises a cloud area value and a cloud shadow area value.

11. A non-transitory computer-readable storage medium storing a computer program, wherein the program, when executed by a processor, implements operations of:

identifying and expanding a cloud area and a cloud shadow area from each of a plurality of multispectral images of a target area, and generating a plurality of single-band images;

calculating at least one reference image required for patching the multispectral image and a patching sequence of reference images according to similarities among the single-band images, wherein the reference image is selected from one or more of the plurality of multispectral images;

determining a patching area of the multispectral image according to a cloud mask image corresponding to the single-band image;

replacing pixel values of the patching area of the multispectral image with pixel values of non-cloud areas of the reference images according to the patching sequence, to obtain a replacement patching image;

recording serial number values of the reference images, corresponding to each of the multispectral images, in the patching area, to obtain a replacement reference mask image; and performing cloud patching on each replacement patching image and each replacement reference mask image in the target area through Poisson fusion, wherein the performing cloud patching on each replacement patching image and each replacement reference mask image in the target area through Poisson fusion, comprises:

setting a guide vector value outside the patching area of the multispectral image to 0;

dividing a boundary of the multispectral image into a patching area boundary and a patching area inner boundary; and for guide vector values at the patching area inner boundary, using adjacent pixel values from a same reference image.

12. The non-transitory computer-readable storage medium of claim 11, wherein the identifying and expanding the cloud area and the cloud shadow area from each of the plurality of multispectral images of the target area, and generating the plurality of single-band images, comprises:

identifying the cloud area and the cloud shadow area from the multispectral image, and generating a cloud mask image to be selected;

remarking a cloud area and a cloud shadow area, which are less than a first preset pixel value, in the cloud mask image to be selected as a clear ground surface, and remarking a clear ground surface, which is less than a second preset pixel value, as the cloud area; and inflating the remarked cloud area to a scale with a radius of no more than a first extended pixel, and inflating the remarked cloud shadow area to a scale with a radius of no more than a second extended pixel, to obtain the cloud mask image.

13. The non-transitory computer-readable storage medium of claim 11, wherein the calculating the at least one reference image required for patching the multispectral image and the patching sequence of the reference images according to the similarities among the single-band images, comprises:

for the plurality of multispectral images and a plurality of cloud mask images, generating thumbnails of the single-band images and thumbnails of the cloud mask images based on a preset waveband by using a nearest neighbor interpolation method;

calculating the similarities among the single-band images according to the thumbnails of the single-band images;

filling a marked area in the multispectral image corresponding to the single-band image by using non-cloud area pixels in thumbnails of the reference images in sequence, according to a ranking of similarities between the reference images and the single-band image, wherein the marked area is marked by the thumbnail of the cloud mask image corresponding to the single-band image; and recording the reference images used in a filling process and a corresponding patching sequence in a case where the marked area is filled or a filled area is no longer reduced.

14. The non-transitory computer-readable storage medium of claim 13, wherein the calculating the similarities among the single-band images according to the thumbnails of the single-band images, comprises:

calculating the similarities by using a structural similarity index, an image acquisition time, and a cloud cover amount, wherein a calculation formula is as follows:

$$S_{ij} = a \cdot SSIM(I_i, I_j) + b \cdot \frac{1}{T_{ij}} + c \cdot \frac{C_j + C_{ij}}{2M_{ij}}$$

wherein a, b, and c are weighting coefficients, $S_{ij}$ is a similarity between thumbnails $I_i$ and $I_j$ of the single-band images, SSIM ($I_i$, $I_j$) is a structural similarity index of the thumbnails $I_i$ and $I_j$, $T_{ij}$ is an acquisition time interval of the thumbnails $I_i$ and $I_j$, $C_j$ is a cloud cover amount of the thumbnail $I_j$, $C_{ij}$ is a common cloud area and cloud shadow area of the thumbnails $I_i$ and $I_j$, $M_i$ and $M_j$ are cloud mask thumbnails corresponding to the thumbnails $I_i$ and $I_j$ respectively, and $M_{ij}$ is a number of common non-zero pixels in $M_i$ and $M_j$.

15. The non-transitory computer-readable storage medium of claim 14, wherein a calculation formula of the structural similarity index is as follows:

$$SSIM(I_i, I_j) = \frac{(2\mu_i\mu_j + C)(2\sigma_{ij} + C)}{(\mu_i^2 + \mu_j^2 + C)(\sigma_i^2 + \sigma_j^2 + C)}$$

wherein SSIM ($I_i$, $I_j$) is the structural similarity index of the thumbnails $I_i$ and $I_j$, C is a constant, $\mu_i$ and $\mu_j$ are mean values of pixel positions, with a corresponding cloud mask area value of 1, of the thumbnails $I_i$ and $I_j$ respectively, $\sigma_i$ and $\sigma_j$ are standard deviations of the pixel positions, with the corresponding cloud mask area value of 1, of the thumbnails $I_i$ and $I_j$ respectively, $\sigma_{ij}$ is a covariance of the pixel positions, with the corresponding cloud mask area value of 1, of the thumbnails $I_i$ and $I_j$, and the cloud mask area value comprises a cloud area value and a cloud shadow area value.

\* \* \* \* \*